US009832200B2

(12) United States Patent
Kurian et al.

(10) Patent No.: US 9,832,200 B2
(45) Date of Patent: *Nov. 28, 2017

(54) MULTI-TIERED PROTECTION PLATFORM

(71) Applicant: Bank of America Corporation, Charlotte, NC (US)

(72) Inventors: Manu Kurian, Dallas, TX (US); Sorin N. Cismas, Southlake, TX (US)

(73) Assignee: Bank of America Corporation, Charlotte, NC (US)

( * ) Notice: Subject to any disclaimer, the term of this patent is extended or adjusted under 35 U.S.C. 154(b) by 105 days.

This patent is subject to a terminal disclaimer.

(21) Appl. No.: 14/968,377

(22) Filed: Dec. 14, 2015

(65) Prior Publication Data

US 2017/0171207 A1 Jun. 15, 2017

(51) Int. Cl.
*H04L 29/06* (2006.01)
*H04L 29/08* (2006.01)
*G06Q 30/00* (2012.01)

(52) U.S. Cl.
CPC ............ *H04L 63/10* (2013.01); *G06Q 30/00* (2013.01); *H04L 67/02* (2013.01); *H04L 67/1097* (2013.01); *H04L 67/20* (2013.01)

(58) Field of Classification Search
CPC ...................................................... H04L 63/10
See application file for complete search history.

(56) References Cited

U.S. PATENT DOCUMENTS

| 6,445,680 | B1 * | 9/2002 | Moyal ................. H04L 12/5601 370/236 |
| 7,031,974 | B1 * | 4/2006 | Subramaniam ... G06F 17/30575 |
| 7,237,256 | B2 | 6/2007 | Cheng et al. |
| 7,747,856 | B2 | 6/2010 | Favazza et al. |
| 8,489,741 | B2 | 7/2013 | Chalasani et al. |
| 8,606,879 | B2 | 12/2013 | Winkler et al. |
| 8,683,607 | B2 | 3/2014 | Lee et al. |
| 8,763,098 | B2 | 6/2014 | Lee |
| 8,869,251 | B2 | 10/2014 | Miller et al. |
| 8,949,939 | B2 | 2/2015 | Peddada |
| 8,984,010 | B2 | 3/2015 | Samudrala et al. |
| 9,003,189 | B2 | 4/2015 | Yin et al. |
| 9,055,314 | B2 | 6/2015 | Yin et al. |
| 9,118,657 | B1 | 8/2015 | Shetty |

(Continued)

*Primary Examiner* — Shawnchoy Rahman
(74) *Attorney, Agent, or Firm* — Banner & Witcoff, Ltd.; Michael A. Springs

(57) ABSTRACT

A multi-tier platform provides additional security at a perimeter of a computer system, where an intermediate layer interacts with a web layer and controls data presentation to the web layer. When the intermediate layer receives a data request for dynamic data from the web layer, the intermediate layer obtains source data from the registered source and may remove a specified portion from the source data to obtain the dynamic data before returning it to the web layer. When requested data comprises static data, the intermediate layer accesses the static data from storage maintained at the intermediate layer. The intermediate layer obtains the static data by the registered source previously publishing source data and the intermediate layer removing a specified portion from it. Source data may assume different forms including a webpage of an external service provider with embedded third-party information being removed by the intermediate layer before presenting it.

19 Claims, 12 Drawing Sheets

(56) References Cited

U.S. PATENT DOCUMENTS

| | | |
|---|---|---|
| 9,137,228 B1 | 9/2015 | Newstadt |
| 2001/0037368 A1 | 11/2001 | Huang |
| 2002/0004733 A1 | 1/2002 | Addante |
| 2002/0010932 A1 | 1/2002 | Nguyen et al. |
| 2002/0038350 A1 | 3/2002 | Lambert et al. |
| 2002/0042789 A1* | 4/2002 | Michalewicz .... G06F 17/30713 |
| 2002/0046281 A1 | 4/2002 | Cope |
| 2002/0078237 A1 | 6/2002 | Leighton et al. |
| 2002/0082926 A1 | 6/2002 | Shuster |
| 2002/0107981 A1 | 8/2002 | Moore et al. |
| 2002/0124080 A1 | 9/2002 | Leighton et al. |
| 2002/0129134 A1 | 9/2002 | Leighton et al. |
| 2002/0129143 A1 | 9/2002 | McKinnon et al. |
| 2002/0143520 A1 | 10/2002 | Gauthier et al. |
| 2002/0194373 A1 | 12/2002 | Choudhry |
| 2003/0084098 A1 | 5/2003 | Lavin et al. |
| 2004/0054898 A1 | 3/2004 | Chao et al. |
| 2004/0098229 A1 | 5/2004 | Error et al. |
| 2004/0187076 A1 | 9/2004 | Ki et al. |
| 2004/0225955 A1* | 11/2004 | Ly .................... G06Q 10/06 715/273 |
| 2004/0250075 A1 | 12/2004 | Anthe et al. |
| 2005/0010662 A1 | 1/2005 | Prabhakar et al. |
| 2005/0015512 A1 | 1/2005 | Kale et al. |
| 2005/0027882 A1 | 2/2005 | Sullivan et al. |
| 2005/0060646 A1 | 3/2005 | Gauthier et al. |
| 2005/0071421 A1 | 3/2005 | Calo et al. |
| 2005/0076342 A1 | 4/2005 | Levins et al. |
| 2005/0097060 A1 | 5/2005 | Lee et al. |
| 2005/0105513 A1 | 5/2005 | Sullivan et al. |
| 2005/0108639 A1 | 5/2005 | Fields et al. |
| 2005/0120292 A1 | 6/2005 | Suzuki |
| 2005/0138381 A1 | 6/2005 | Stickle et al. |
| 2005/0144297 A1 | 6/2005 | Dahlstrom et al. |
| 2005/0188007 A1 | 8/2005 | Warner et al. |
| 2005/0262026 A1 | 11/2005 | Watkins |
| 2006/0015366 A1 | 1/2006 | Shuster |
| 2006/0059416 A1 | 3/2006 | Lin |
| 2006/0161660 A1 | 7/2006 | Brault et al. |
| 2006/0218305 A1 | 9/2006 | Kinnan et al. |
| 2006/0224677 A1 | 10/2006 | Ishikawa et al. |
| 2006/0248452 A1 | 11/2006 | Lambert et al. |
| 2006/0253446 A1 | 11/2006 | Leong et al. |
| 2006/0274896 A1 | 12/2006 | Livesay |
| 2007/0038729 A1 | 2/2007 | Sullivan et al. |
| 2007/0038755 A1 | 2/2007 | Sullivan et al. |
| 2007/0289004 A1 | 12/2007 | Chao et al. |
| 2007/0291739 A1 | 12/2007 | Sullivan et al. |
| 2008/0071925 A1 | 3/2008 | Leighton et al. |
| 2008/0082686 A1 | 4/2008 | Schmidt et al. |
| 2008/0112429 A1 | 5/2008 | McKinnon et al. |
| 2008/0133516 A1 | 6/2008 | Itzhak |
| 2008/0168169 A1 | 7/2008 | Cope |
| 2008/0172404 A1 | 7/2008 | Cohen |
| 2008/0195665 A1 | 8/2008 | Mason et al. |
| 2008/0201413 A1 | 8/2008 | Sullivan et al. |
| 2008/0201472 A1 | 8/2008 | Bistriceanu et al. |
| 2008/0235106 A1 | 9/2008 | Reisman |
| 2008/0301116 A1 | 12/2008 | Wang et al. |
| 2009/0006424 A1 | 1/2009 | Coppola et al. |
| 2009/0019106 A1 | 1/2009 | Loupia |
| 2009/0037997 A1 | 2/2009 | Agbabian et al. |
| 2009/0055274 A1 | 2/2009 | Calo et al. |
| 2009/0119391 A1 | 5/2009 | Kale et al. |
| 2009/0157875 A1 | 6/2009 | Britton et al. |
| 2009/0177771 A1 | 7/2009 | Britton et al. |
| 2009/0204688 A1 | 8/2009 | Britton et al. |
| 2009/0288155 A1 | 11/2009 | Joshi et al. |
| 2009/0298470 A1 | 12/2009 | Huber et al. |
| 2009/0313261 A1 | 12/2009 | Corella |
| 2010/0024032 A1 | 1/2010 | Britton et al. |
| 2010/0036944 A1 | 2/2010 | Douglis et al. |
| 2010/0042681 A1 | 2/2010 | Jeon et al. |
| 2010/0042743 A1 | 2/2010 | Jeon et al. |
| 2010/0057589 A1 | 3/2010 | Li et al. |
| 2010/0083132 A1 | 4/2010 | Ulrich et al. |
| 2010/0138559 A1 | 6/2010 | Sullivan et al. |
| 2010/0205662 A1 | 8/2010 | Ibrahim et al. |
| 2010/0250742 A1 | 9/2010 | Leighton et al. |
| 2010/0287155 A1 | 11/2010 | Reisman |
| 2010/0299735 A1 | 11/2010 | Jiang |
| 2010/0310057 A1 | 12/2010 | Theppasandra et al. |
| 2011/0023099 A1 | 1/2011 | Kim et al. |
| 2011/0030041 A1 | 2/2011 | Favazza et al. |
| 2011/0060998 A1 | 3/2011 | Schwartz et al. |
| 2011/0066716 A1 | 3/2011 | Sullivan et al. |
| 2011/0066724 A1 | 3/2011 | Sullivan et al. |
| 2011/0071997 A1 | 3/2011 | Sullivan et al. |
| 2011/0072124 A1 | 3/2011 | Sullivan et al. |
| 2011/0078326 A1 | 3/2011 | Horibuchi |
| 2011/0119331 A1 | 5/2011 | Zhang |
| 2011/0138052 A1 | 6/2011 | Caplan et al. |
| 2011/0145435 A1 | 6/2011 | Bhatawdekar et al. |
| 2011/0167144 A1 | 7/2011 | Nakamoto |
| 2011/0196721 A1 | 8/2011 | Addante |
| 2011/0219448 A1 | 9/2011 | Sreedharan et al. |
| 2011/0276720 A1 | 11/2011 | Ickman et al. |
| 2011/0289434 A1 | 11/2011 | Kieft |
| 2011/0307341 A1 | 12/2011 | Zohar et al. |
| 2012/0011578 A1 | 1/2012 | Hinton et al. |
| 2012/0072531 A1 | 3/2012 | Akuzawa |
| 2012/0151568 A1 | 6/2012 | Pieczul et al. |
| 2012/0179785 A1 | 7/2012 | Wu et al. |
| 2012/0221685 A1 | 8/2012 | Wu et al. |
| 2012/0233673 A1 | 9/2012 | Ibrahim et al. |
| 2012/0233683 A1 | 9/2012 | Ibrahim et al. |
| 2012/0246306 A1 | 9/2012 | Douglis et al. |
| 2012/0278872 A1 | 11/2012 | Woelfel et al. |
| 2012/0296736 A1 | 11/2012 | Addante |
| 2013/0036460 A1 | 2/2013 | Lau et al. |
| 2013/0061120 A1 | 3/2013 | Zeine et al. |
| 2013/0091356 A1 | 4/2013 | Ail et al. |
| 2013/0124687 A1 | 5/2013 | Nam et al. |
| 2013/0125205 A1 | 5/2013 | Hsu et al. |
| 2013/0238750 A1 | 9/2013 | Fu et al. |
| 2013/0282714 A1 | 10/2013 | Lathrom |
| 2014/0046772 A1 | 2/2014 | Raman |
| 2014/0067524 A1 | 3/2014 | Douglas et al. |
| 2014/0090030 A1 | 3/2014 | Ong |
| 2014/0164613 A1 | 6/2014 | Mason et al. |
| 2014/0164630 A1 | 6/2014 | Wu et al. |
| 2014/0172945 A1 | 6/2014 | Hershberg et al. |
| 2014/0172946 A1 | 6/2014 | Hershberg et al. |
| 2014/0173032 A1 | 6/2014 | Kruglick |
| 2014/0207911 A1 | 7/2014 | Kosmach et al. |
| 2014/0213220 A1 | 7/2014 | Huber et al. |
| 2014/0229548 A1 | 8/2014 | Ulrich et al. |
| 2014/0280468 A1 | 9/2014 | Duncan et al. |
| 2014/0280756 A1 | 9/2014 | Maity et al. |
| 2014/0281894 A1 | 9/2014 | Maity et al. |
| 2014/0344332 A1 | 11/2014 | Giebler |
| 2014/0344928 A1 | 11/2014 | Sreedharan et al. |
| 2014/0359073 A1 | 12/2014 | Mendoza |
| 2015/0007263 A1 | 1/2015 | Stewart et al. |
| 2015/0031332 A1 | 1/2015 | Clark et al. |
| 2015/0135281 A1 | 5/2015 | Peddada |
| 2015/0154158 A1 | 6/2015 | Zeine et al. |
| 2015/0154649 A1 | 6/2015 | Raman |
| 2015/0186544 A1 | 7/2015 | Benedum et al. |
| 2015/0188906 A1 | 7/2015 | Minov et al. |
| 2015/0207660 A1 | 7/2015 | Sundaram et al. |
| 2016/0203337 A1* | 7/2016 | Dubovsk .............. G06F 21/6263 726/30 |

* cited by examiner

| | Data Set ID | Registered Source | Value | |
|---|---|---|---|---|
| 105 | Data Set 1 | Application_1 | Value_1 | 701 |
| 106 | Data Set 2 | Application_2 | Ø | 702 |
| 107 | Data Set 3 | External Service Provider | Value_3 | 703 |

| Data Set ID | Registered Source | Value | Related Data Sets | Expiration Time |
|---|---|---|---|---|
| Data Set 1 | Application_1 | Value_1 | Data Set 4 | 2:21 pm |
| Data Set 2 | Application_2 | ∅ | | |
| Data Set 3 | External Service Provider | Value_2 | | 3:30 pm |
| Data Set 4 | Application_3 | Value_3 | | Not Specified |

FIG. 8

MULTI-TIERED PROTECTION PLATFORM

FIELD

Aspects described herein relate to computer systems and computer networks. More particularly, aspects described herein relate to a multi-tier platform that provides security at a perimeter of a computer system.

BACKGROUND

In order to provide security of a computer system, it is important to secure the outer perimeter of the system. One traditional approach is to implement a demilitarized zone (DMZ), sometimes referred to as a perimeter network, as a physical or logical subnetwork that contains and exposes a computer network's external-facing services to a larger and untrusted network, usually the Internet. However, there may be differing front end components in the outer perimeter of the computer network that require system maintenance, monitoring, and governance to ensure the computer network is not susceptible to compliance failures, and other factors. Moreover, traditional approaches typically implement a web layer that requires one or more redirects between different service providers through the Internet, thus exposing the network to possible security vulnerabilities.

Consequently, it beneficial to enhance the security of a computer network in the context of traditional approaches.

SUMMARY

Aspects of the disclosure relate to a multi-tier platform that may provide additional security at a perimeter of a computer system. An intermediate layer interacts with a web layer and controls data presentation to the web layer. When the intermediate layer receives a data request for dynamic data from the web layer, the intermediate layer obtains source data from the registered source and may remove a data portion from the source data to obtain the dynamic data before returning it to the web layer.

According to an aspect described herein, source data may comprise static data, which is stored at the intermediate layer. In such a case, the registered source publishes source data to the intermediate layer. The intermediate layer subsequently removes a specified data portion from the published source data to obtain the static data and stores it in a storage device. When the intermediate layer receives a data request for the static data via the web layer, the intermediate layer accesses the stored data without querying the registered source.

According to an aspect described herein, the registered source may be an external source of a service provider. The source data may assume different forms including a webpage with embedded third-party information such as an embedded announcement within the webpage. Consequently, the content of the remaining part of the webpage is returned by the intermediate layer to the web layer.

According to an aspect described herein, the intermediate layer interacts with an external service provider via a communication interface without interacting with the web layer.

According to an aspect described herein, The intermediate layer receives one or more configuration messages from an administrative system that specify a data portion to be removed from the source data, e.g., third-party information component from a webpage.

According to an aspect described herein, a third-party information component comprises an announcement component.

According to an aspect described herein, when an internal application is the registered source for requested data (comprising static and/or dynamic data), the intermediate layer interacts between the web layer and an application layer.

Aspects of the embodiments may be provided in a computer-readable medium having computer-executable instructions to perform one or more of the process steps described herein.

These and other aspects of the embodiments are discussed in greater detail throughout this disclosure, including the accompanying drawings.

BRIEF DESCRIPTION OF THE DRAWINGS

The present disclosure is illustrated by way of example and not limited in the accompanying figures in which like reference numerals indicate similar elements and in which:

FIG. 7 depicts a data structure that specifies data sets in accordance with one or more illustrative embodiments.

FIG. 8 depicts a data structure that specifies data sets in accordance with one or more illustrative embodiments.

DETAILED DESCRIPTION

Figure 1:
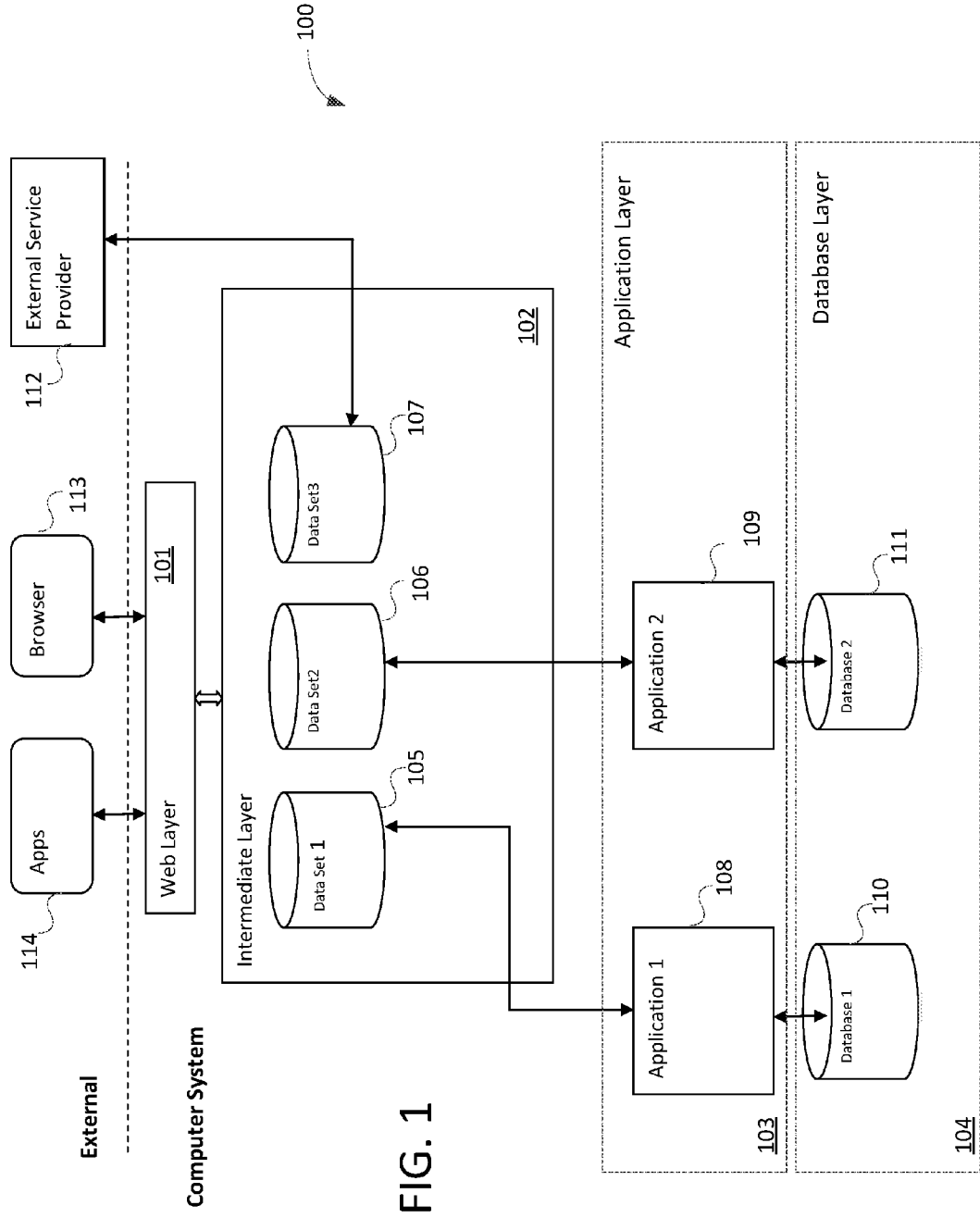
FIG. 1 depicts a computer system that supports a multi-tier protection platform in accordance with one or more illustrative embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Illustrative embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer executable product, and/or other device), a method, or a combination of the foregoing. Accordingly, embodiments of the present invention may take the form of an entirely hardware embodiment, an entirely software embodiment (including firmware, resident software, micro-code), or an embodiment combining software and hardware aspects that may generally be referred to herein as a "system." In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media. Embodiments of the present invention are described below with reference to flowchart illustrations and/or block diagrams of processes or apparatuses (the term "apparatus" including systems and computer executable products). It will be understood that each block of the flowchart illustrations and/or block diagrams, and combinations of blocks in the flowchart illustrations and/or block diagrams, can be implemented by computer executable instructions. These computer executable instructions may be provided to a processor of a special purpose computer or other executable data processing apparatus to produce a particular machine, such that the instructions, which execute by the processor of the computer or other executable data processing apparatus, create mechanisms for implementing the functions/acts specified in the flowchart and/or block diagram block or blocks.

These computer executable instructions and algorithms described herein may also be stored in a computer-readable memory that can direct a computer or other executable data processing apparatus to function in a particular manner, such that the instructions stored in the computer readable memory produce an article of manufacture including instructions, which implement the function/act specified in the flowchart and/or block diagram block or blocks.

FIG. 1 depicts computer system 100 that supports for a multi-tier protection platform in accordance with one or more example embodiments. A corresponding multi-tiered model partitions computer system 100 into different layers based on functionality. The multi-tier protection platform comprises four layers: web layer 101, intermediate layer 102, application layer 103, and database layer 104. With one aspect, additional security at the perimeter of computer system 100 is enhanced with respect to traditional approaches.

Intermediate layer 102 interacts between web layer 101 and application layer 103, where intermediate layer 102 may function as an aggregate layer that supports both database and messaging services. A data set registered to a source, e.g., application (e.g., 108 or 109) internal to computer system 100 or an external source (e.g., external service provider 112), may be stored at intermediate layer 102 (where the value is static) or may be accessed from the registered source via intermediate layer 102 (where the value is dynamic). Consequently, application layer 103 and database layer 104 are buffered by intermediate layer 102 with respect to a data request received at web layer 101.

A data set (or dataset) may be a collection of data and may correspond to the contents of a single database table, or a single statistical data matrix, where every column of the table represents a particular variable, and each row corresponds to a given member of the data set in question. The data set lists values for each of the variables, such as height and weight of an object, for each member of the data set. Each value is known as a datum. The data set may comprise data for one or more members, corresponding to the number of rows.

Multiple applications may be registered as authoritative of different sets of data and thus intermediate layer 102 may act as an aggregation layer, thus circumventing redirects between different service providers at web layer 101. With this approach, a service provider may deliver a consolidated service without web redirects that may otherwise introduce additional security concerns. For example, intermediate layer 102 may access value 703 (as shown in FIG. 7) from external service provider 112, where service provider 112 is deemed as being trusted. With traditional approaches, a redirect at web layer 101 may result in a redirect to a web site that is untrusted.

With some embodiments, the term "value" may refer to a set of values corresponding to one or more variables that are supported by a source.

A data request from an on-line user (e.g., desktop corresponding to browser 113 or mobile corresponding to apps 114) is first handled by web layer 101 and then passed to intermediate layer 102. If intermediate layer 102 already has the requested data, which may assume the form of a data set, intermediate layer 102 responds back to the on-line requestor, thus acting as a database. This situation may be prevalent for users of apps 114 that incorporate the required logic and need only updated information provided by intermediate layer 102. If intermediate layer 102 does not have the requested data, intermediate layer 102 may notify the authoritative source for the corresponding data set and request the information, thus acting as a data/information platform (e.g., messaging platform).

Application layer 103 may support one or more applications 108 and 109 of the computer system 100. Applications 108 and 109 may support logic (e.g., business logic) associated with processing by an entity (e.g., a business) using computer system 100. Application layer 103, in turn, interacts with database layer 104, which stores data used by the application. For example, databases 110 and 111 are associated with applications 108 and 109, respectively.

A data request (e.g., from apps 114 or browser 113) that requests data from data set 105 is received at web layer 101 and passed to intermediate layer 102. Through data structure 700 (shown in FIG. 7 as will be discussed), intermediate layer 102 determines that application 108 is the authoritative application (registered source) for data set 105 and whether data set 105 has a static or dynamic value.

With some embodiments, a data request may request data from a plurality of data sets. Moreover, some of the data sets may have a static value and some of the data sets have a dynamic value.

The value is static if the value does not change during a time duration so that intermediate layer 102 does not need to query the authoritative application in order to obtain the value. If so, intermediate layer 102 accesses the value stored at the intermediate layer. For example, the value of data set 105 is static as configured in data structure 700, the authoritative application is application 108, and the value equals value 701.

However, if the value is dynamic (e.g., the value may change each instance that the data set is accessed) intermediate layer 102 queries the authoritative application registered to the data set, obtains the value from the authoritative application, and returns the dynamic value via the web layer 102. For example, the value for data set 106 is dynamic as configured in data structure 700. The authoritative application is application 109, and the value is denoted as φ 702, which denotes that the value is dynamic. In such a case, the value (which may be referred as a dynamic data indicator) is accessed by intermediate layer 102 from application 109 whenever intermediate layer 102 receives a data request for data set 106 through web layer 101.

While FIG. 1 depicts data sets 105-107 as logically separate, embodiments may implement the data sets as separate data structures, as a single data structure, or as a combination of separate and combined data structures.

Figure 2:
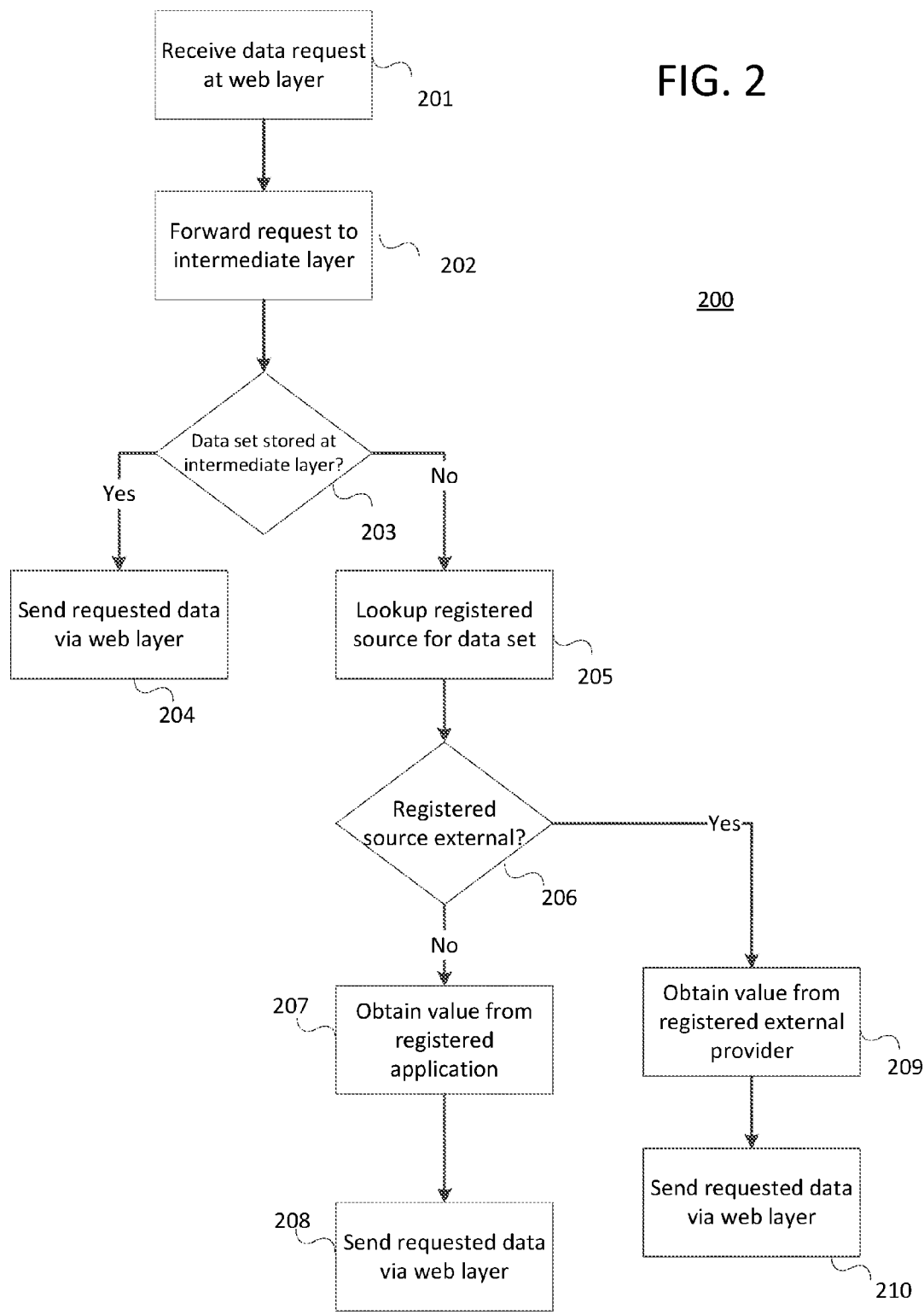
FIG. 2 shows a flowchart of an algorithm that may be performed at an intermediate layer to support a multi-tier platform in accordance with one or more illustrative embodiments.

FIG. 2 shows flowchart 200 for an algorithm that may be performed at intermediate layer 102 to support a multi-tier platform in accordance with one or more example embodiments. At block 201, intermediate layer 102 receives a data request at web layer 101, which forwards the request to intermediate layer 102 at block 202.

At block 203, intermediate layer 102 determines the specific data set that is associated with the request. (However, if intermediate layer 102 is unable to identify the specific data set, the back-office may be alerted and the user informed of the missing data. However, with some embodiments, the data set may be computed and the finding may then be presented.) Once the data set has been identified, intermediate layer 102 determines whether the value of the data set is stored at the intermediate layer 102 (i.e., whether the value is static or dynamic as previously discussed). If the value is stored at intermediate layer 102, the requested data is returned via web layer 101 at block 203

However, if the value is not stored at intermediate layer 102 (i.e., the value is dynamic), intermediate layer 102 looks up the registered source of the data set via a data structure (e.g., lookup table shown in FIG. 7 or 8) at block 205. Intermediate layer 102 then determines whether the registered source is internal or external to computer system 100 at block 206.

If the registered source is internal to computer system 100 (e.g., the registered source is an internal application such as application 108 or 109), intermediate layer 102 obtains the value for the data set from the application at block 207. Also, with some embodiments, the obtained value may be stored in the corresponding data set. The requested data is then sent to the requestor via web layer 101 at block 208.

If the registered source is external to computer system 100 (e.g., the registered source is an external service provider such as provider 112), intermediate layer 102 obtains the value for the data set from the external source, for example, via the Internet at block 209. The requested data is then sent to the requestor via web layer 101 at block 210.

With some embodiments, requested data may span more than one registered source such as application 108 and another application (denoted as application_3 in FIG. 8) as depicted in the data structure in FIG. 8. Intermediate layer 102 may then return multiple values to the requestor at blocks 204, 208, or 210. Moreover, the plurality of registered sources for the requested data may pertain to all internal sources, all external sources, or a combination of internal and external sources.

Figure 3:
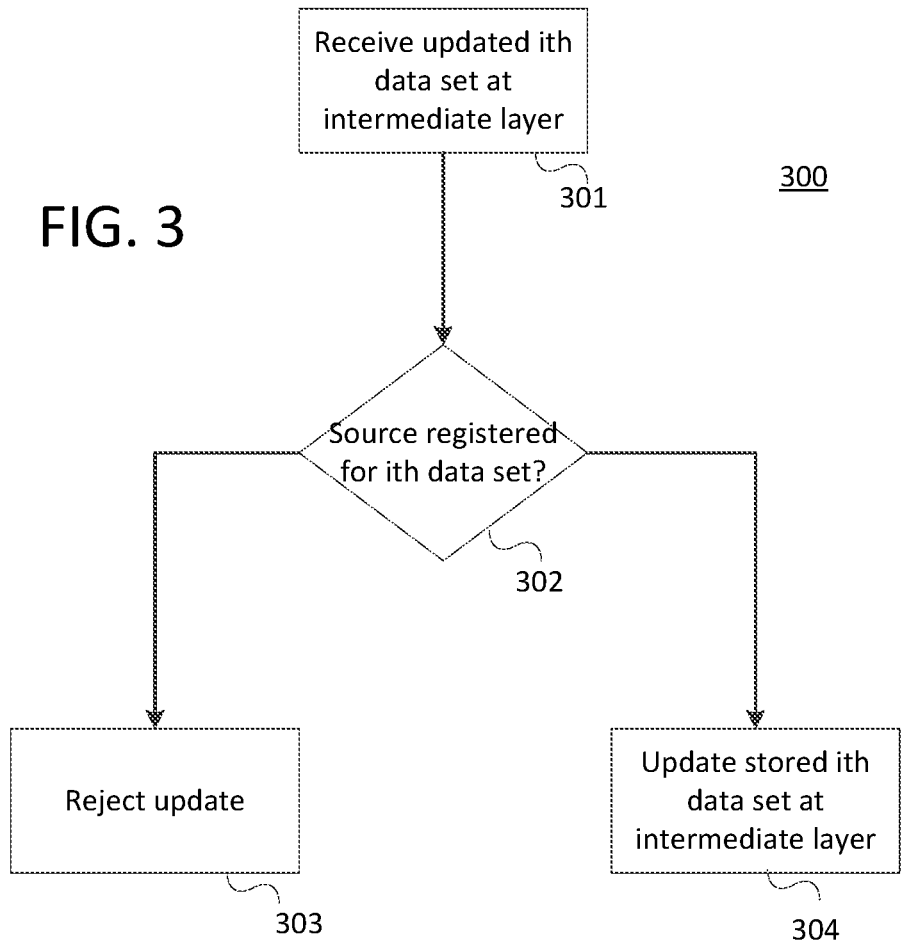
FIG. 3 shows a flowchart of an algorithm that may be performed at an intermediate layer to register data sets to sources in accordance with one or more illustrative embodiments.

FIG. 3 shows flowchart 300 for an algorithm that may be performed at intermediate layer 102 to register data sets to sources in accordance with one or more example embodiments. As depicted in FIG. 1, different data sets are registered to different sources. For example, data set 105 is registered to application 108 and data set 107 is registered to external service provider 112. As will be discussed, supported data sets are mapped to different sources in a data structure, for example, as shown in FIG. 7. The mapping may be configured through administrative module 405, as shown in FIG. 4, or through administrative server 507 as shown in FIG. 5.

Referring to FIG. 3, when a value in a data set is static, the value may be unchanged over a period of time. However, with some embodiments, when the registered source determines that the value has changed, the registered source updates the value stored at intermediate layer 102 at block 301. If the source is deemed to be the registered source at block 302, the stored value is updated at block 304. If the source is not registered, the update is rejected by intermediate layer 102 at block 303. With some embodiments, the data (value) may also be signed to prevent the data from being altered. With a dynamic data set, a "time to expire" attribute may invalidate/expire the data.

Figure 4:
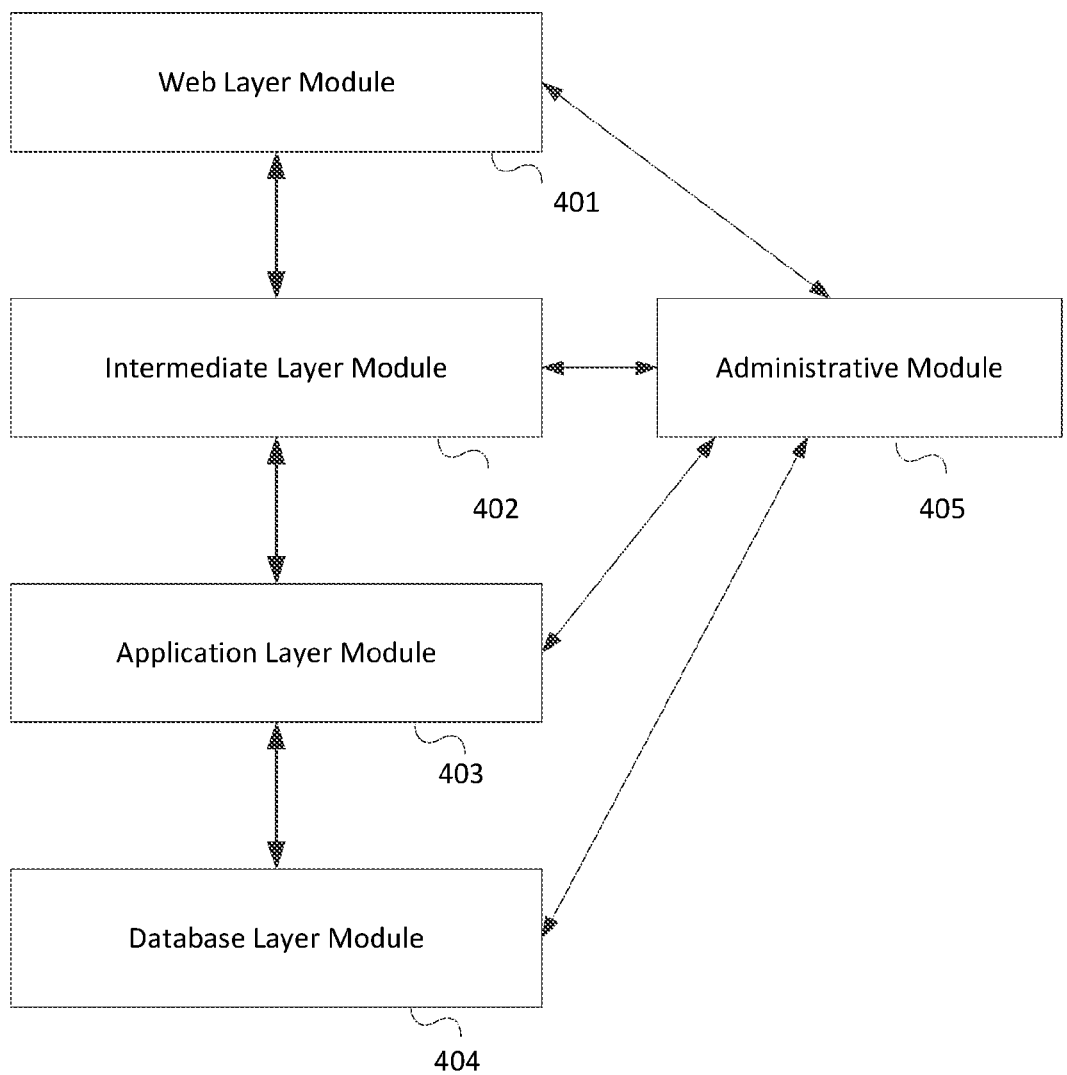
FIG. 4 shows a computer system that supports a multi-tier protection platform in accordance with one or more illustrative embodiments.
Figure 5:
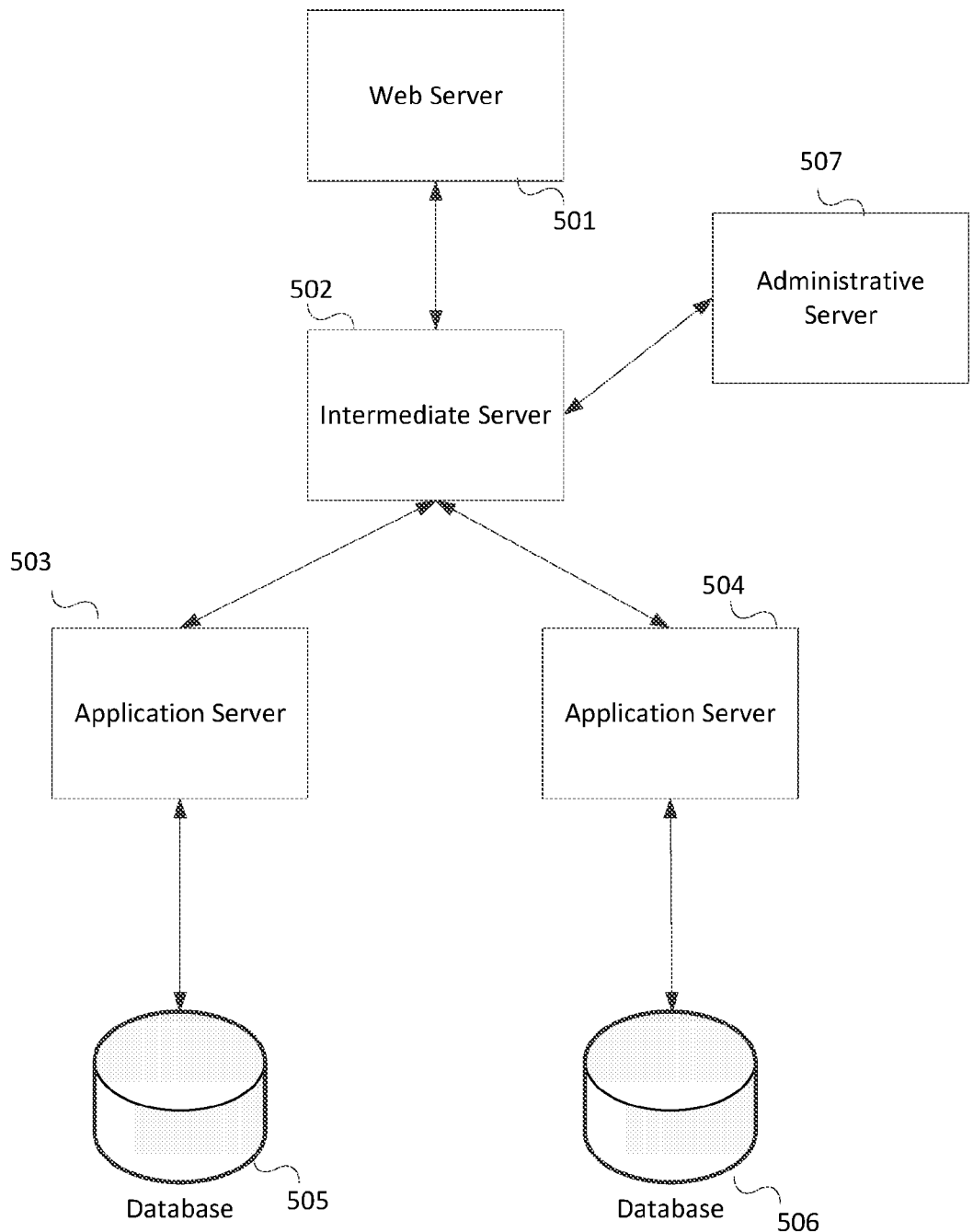
FIG. 5 shows a computer network supporting a multi-tier platform in accordance with one or more illustrative embodiments.

FIG. 4 shows computer system 400 that supports a multi-tier protection platform in accordance with one or more example embodiments. System 400 comprising a plurality of modules 401, 402, 403, and 404 that support web layer 101, intermediate layer 102, application layer 103, and database layer 104, respectively. One or more modules 401-404 may be implemented on one or more computer devices with one or more memory devices. For example, each module may execute on different computer servers as shown in FIG. 5.

Also, administrative module 405 supports administrative functionality for modules 401-404. For example, a data structure (e.g., lookup table 700 or 800 shown in FIGS. 7 and 8, respectively) may be configured to map data sets 105-107 to corresponding registered sources 108, 109, and 112, respectively. Administrative module 405 may also enable data integration by determining the data sources based on need. For example, a data source may be one that will no longer be used after a set day/time or that may be added. Moreover, administrative module 405 may provide security measures so that an unauthorized party cannot maliciously modify configuration information or install malicious software in any modules of computer system 400.

With some embodiments, modules 401-405 may be embodied in computer-executable code that is stored in one or more memory devices and executed by one or more computer devices and/or embodied in hardware/firmware components such as integrated circuits, application-specific integrated circuits (ASICs), field executable gate arrays, and the like.

FIG. 5 shows computer network 500 supporting a multi-tier platform in accordance with one or more example embodiments. Referring to FIG. 4, servers 501, 502, 503-504, 505-506, 507 support modules 401, 402, 403, 404, and 405, respectively.

With some embodiments, servers 501-507 interconnect via a local area network (LAN) or a wide area network (WAN). It will be appreciated that the network connections shown are illustrative and other means of establishing a communications link between the computing devices may be used. The existence of any of various well-known protocols such as TCP/IP, Ethernet, FTP, HTTP, and the like is presumed. Also, connectivity between servers 501-507 may assume wireline and/or wireless means. For example, administrative module 405 (as shown in FIG. 4) may at least partially execute on a portable device that supports a desirable level of security over a wireless communication channel.

Figure 6:
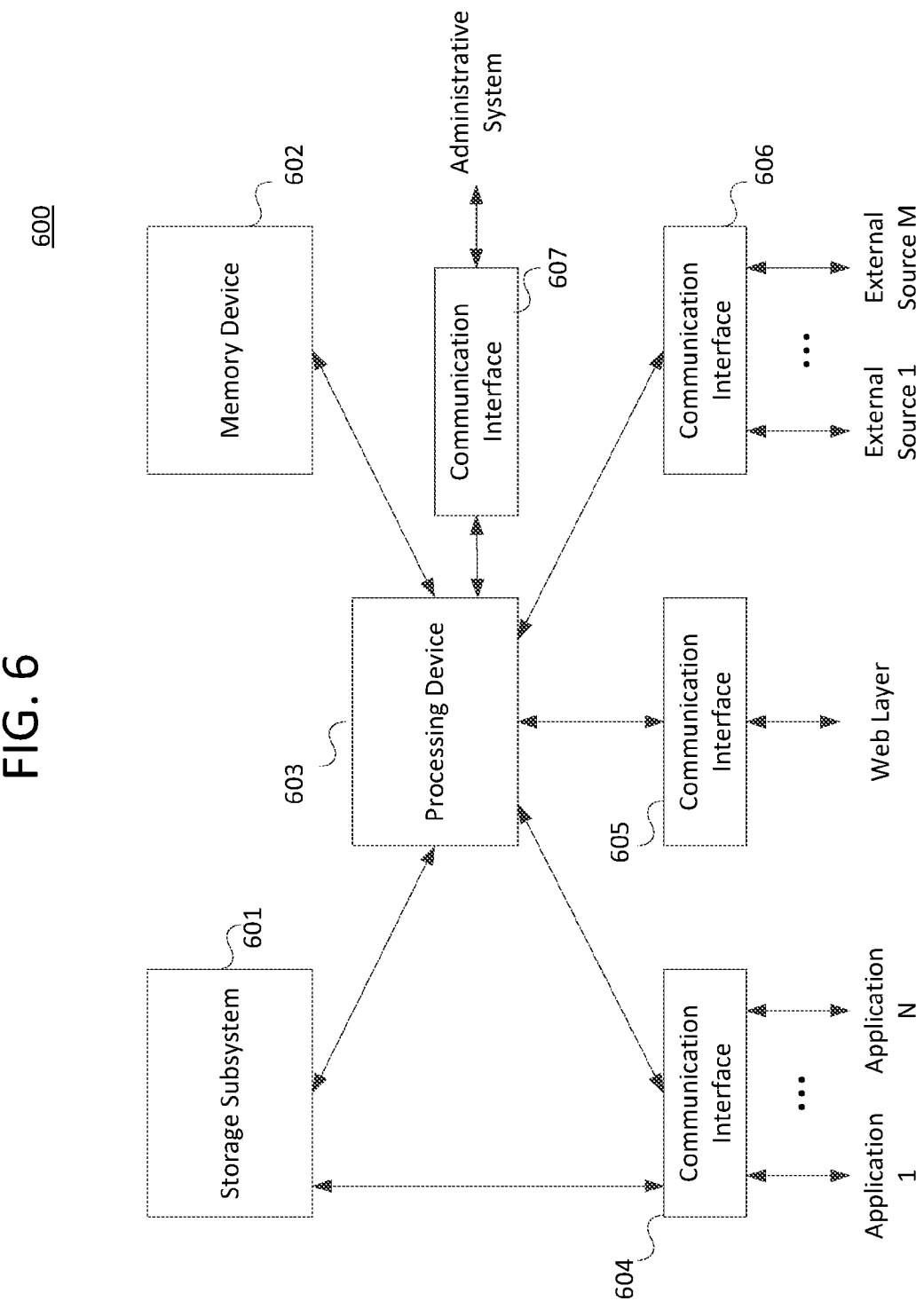
FIG. 6 shows an apparatus that supports an intermediate layer in accordance with one or more illustrative embodiments.

FIG. 6 shows apparatus 600 that supports intermediate layer 102 in accordance with one or more example embodiments. Apparatus 600 includes processing device 603 that executes computer-executable instructions from memory device 602 in order to support the functionality of intermediate layer 102, e.g., process 200 as shown in FIG. 2. However, some embodiments may include one or more processing devices and/or one or more memory devices.

Apparatus stores data sets 105-107 (as shown in FIG. 1) in storage subsystem 601. Storage subsystem 601 may comprise, but is not limited to, random access memory (RAM), read only memory (ROM), electronically erasable read only memory, flash memory or other memory technology, CD-ROM, digital versatile disks (DVD) or other optical disk storage, magnetic tape, magnetic disk storage or other magnetic storage devices, or any other medium that can be used to store information and that can be accessed by computing device 603.

Internal applications (application 1 . . . application N) or external sources (external source 1 . . . external source M) may publish values (if the values are static) for corresponding data sets via processing device 603 or may directly publish updated values to storage subsystem 601 through communication interfaces 604 and 606, respectively. When a value is dynamic, processing device 603 accesses the value from the registered source through communication interfaces 604 and 606 whenever the value is obtained.

When apparatus 600 has obtained the value of the data set for a data request, processing device 603 sends the value to web layer 101 through communication interface 605.

Apparatus 600 also interacts with an administrative system (e.g., administrative module 405 as shown in FIG. 4) in order to configure data structure 700 or 800.

FIG. 7 depicts data structure 700 that specifies data sets in accordance with one or more example embodiments. Intermediate layer 102 accesses data structure in order to obtain a value for a data set in response to a data request via web layer 101.

Each entry of data structure 700 corresponds to a data set comprising a data set ID, registered source identification, and value. As previously discussed, when the value is static, the value is stored at intermediate layer 102. When a value is dynamic, intermediate layer 102 accesses the value from the registered source (e.g., application or external service provider). For example, the first entry corresponds to data set 105, where application 108 is the registered source with a static value equal to value 701. The second entry corresponds to data set 106, where application 109 is the registered source with dynamic data indicator 702 (i.e., intermediate layer 102 accesses application 109 for the value). The third entry corresponds to data set 107, where service provider 112 is the registered source with static value equal to value 703.

FIG. 8 depicts a data structure 800 that specifies data sets in accordance with one or more example embodiments. Data structure 800 is based on data structure 700 with additional attributes (related data sets 802 and expiration time 803) for each entry.

With some embodiments, when a first data set is related to a second data set, values for both data sets are obtained when a data request corresponds to the first data set. For example, data set 105 is related to data set 801. Consequently, intermediate layer 102 obtains and returns value_1 and value_3 to the requestor via web layer 101 when the data request pertains to data set 1. A data set with a static value or a dynamic value may be related to a data set with a dynamic or static value.

However, the data set relationship need not be reciprocal, although it may be reciprocal in some cases. For example, as depicted in data structure 800, data set 801 is not related to data set 105. The relationship corresponding to attribute 802 may be symbolically denoted as $\mathcal{R}$. For example, as shown in FIG. 8, $\mathcal{R}$ (Data Set 1)=Data Set 4 but $\mathcal{R}$ (Data Set 4)≠Data Set 1. Moreover, while not explicitly shown in FIG. 8, embodiments may support nested relationships. For example, one may denote such a situation as $\mathcal{R}$ ($\mathcal{R}$ (Data Set x))=Data Set y.

Expiration time 803 specifies a time after which a static value for a data set is not valid. When this occurs, a static value stored at intermediate layer 102 should not be returned to the requestor until the registered source publishes an updated value to intermediate layer 102. Intermediate layer 102 may utilize one of a number of approaches in such a situation. For example, intermediate layer 102 may return an error indication when the value is expired. Alternatively, intermediate layer 102 may query the registered source to update the value. As another alternative, intermediate layer 102 may wait for the value to be updated, although this approach may result in undesirable waiting times.

Expiration time 803 may not be specified as with data set 801, in which case intermediate layer 102 always returns the available value. However, expiration time 803 is not applicable to dynamic values since intermediate layer 102 accesses the registered source for the value.

While FIGS. 7 and 8 depict single data structures for the data sets, embodiments may support separate data structures for each data set. For example, each entry in table 700 may be implemented as a separate data structure.

With some embodiments, intermediate layer 102 enhances the protection of data at different tiers (e.g., application layer 103 and database layer 104 as shown in FIG. 1). For example, intermediate layer 102 stores static values (static data) and requests dynamic values (dynamic data) provided by authoritative sources so that direct interaction between web layer 101 and application layer 103 and/or database 104 is circumvented, thus reducing the possibility of malicious activity on logic executing at layers 103 and 104. In addition, protection may be enhanced when a requestor requests for data via web layer 101. For example, as will be discussed, data presentation may be controlled at intermediate layer 102. As will be discussed, a data portion of source data (which the requestor may not be allowed access to or which may contain information that is malicious in nature) from the authoritative source may be removed by intermediate layer 102 before presentation via web layer 101.

Figure 9:
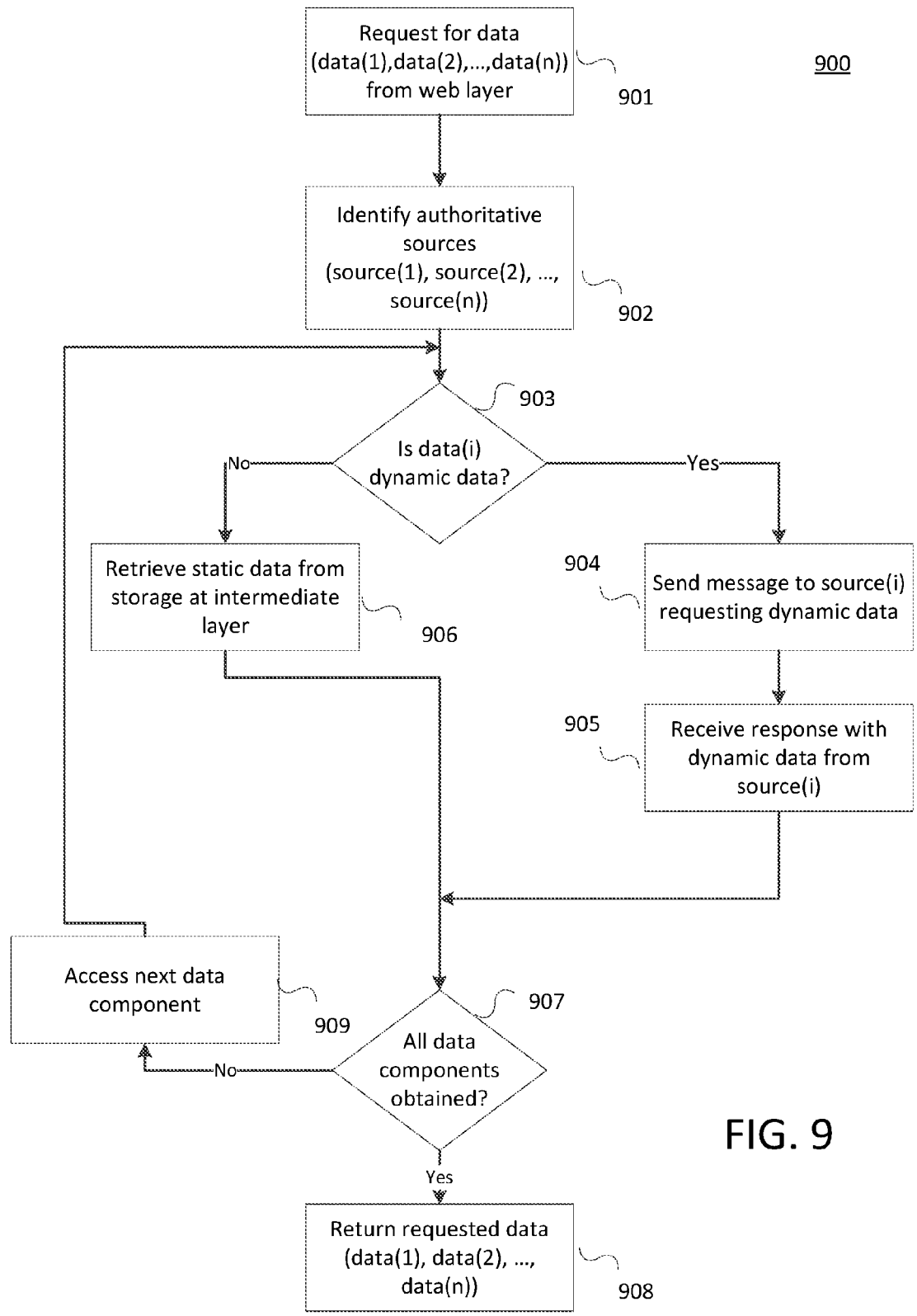
FIG. 9 shows a flowchart in which an intermediate layer supports a messaging platform in accordance with one or more illustrative embodiments.

FIG. 9 shows flowchart 900 in which intermediate layer 102 supports a messaging platform in accordance with one or more illustrative embodiments. At block 901, intermediate layer 102 receives a request via web layer 101 for requested data that may comprise one or more data components. For example a data component may comprise static or dynamic data (which may be referred as a static value or a dynamic value as previously discussed). Consequently, requested data may comprise a combination of static and/or dynamic data components. Moreover, a source may be registered for a plurality of data components, where different sources are logically associated with different data components even though the different sources may be physically the same.

With some embodiments, dynamic data is not stored at intermediate layer 102. Rather dynamic data accessed from the registered source whenever the data is requested via web layer 101.

At block 902, intermediate layer 102 identifies the authoritative source (source(1), source (2), ..., source(n)) that is registered for each data component (data(1), data(2), ..., data(n), respectively). Sources may be registered to data components (e.g., corresponding to data sets 105-107 as shown in FIG. 1) through an administration system via a communication interface as shown in FIG. 6. For example, the administration system may send one or more configuration messages to processing device 603 for mapping the registered sources to the corresponding data components.

At block 903, intermediate layer 102 determines whether a data component contains either static or dynamic data. If the data component contains dynamic data, at block 904 intermediate layer 102 functions as a messaging platform and generates a message to the registered source (e.g., an application or external service provider) for the corresponding dynamic data. For example, as shown in FIG. 1, intermediate layer 102 accesses the dynamic value of data set 106 from application 109. At block 905, the authoritative source returns the dynamic data to intermediate layer 102. However, as will be discussed with FIG. 11, the authoritative source may return source data that includes both the dynamic data as well as additional information. If so, intermediate layer 102 may remove the additional information when returning the dynamic data to web layer 101.

At block 903, if intermediate layer 102 determines that a data component contains static data, intermediate layer 102 accesses the static data from a storage device (e.g., storage subsystem 601 as shown in FIG. 6) that is supported at intermediate layer 102. For example, as shown in FIG. 1, data set 105 stores a static value published by application 105.

At block 906, intermediate layer 102 retrieves the static data that is stored at the intermediate layer.

While static data is stored at intermediate layer 102, the validity of the static data may expire if the registered source does not update (publish) the static data within the validity time duration. However, the registered source may update the static data before the expiration time by republishing the static data.

Figure 10:
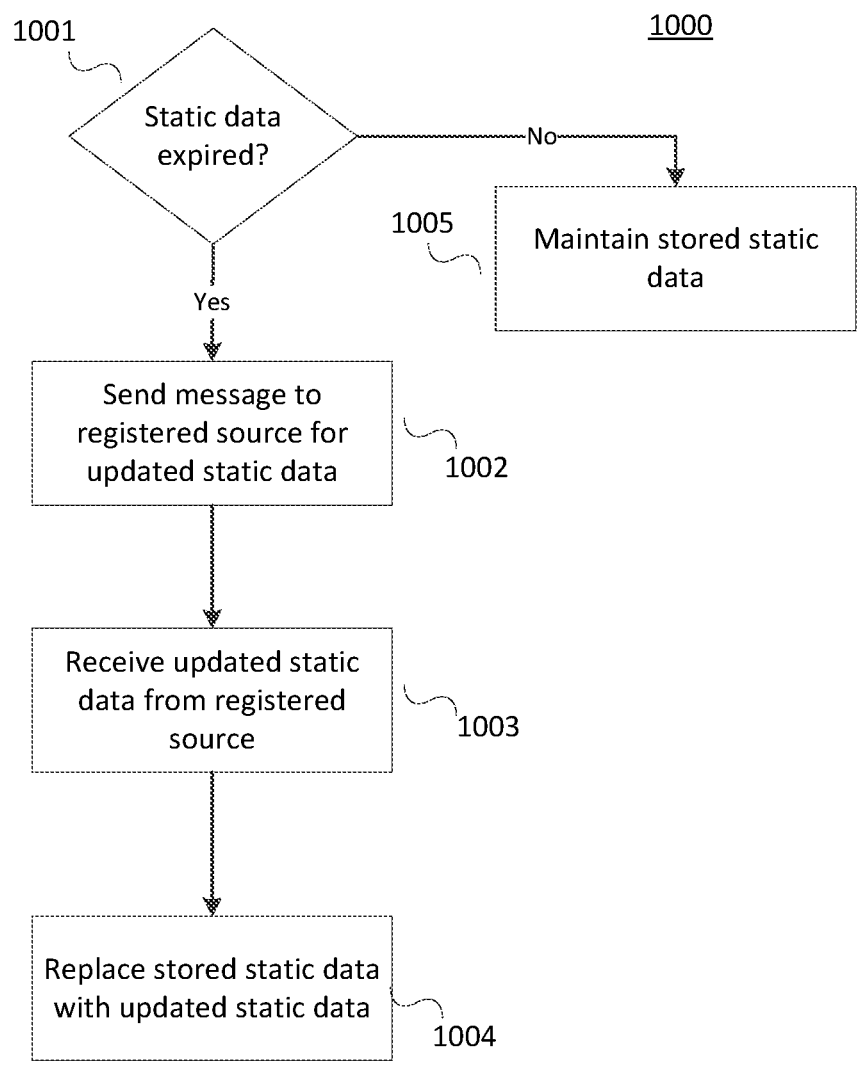
FIG. 10 shows a flowchart in which an intermediate layer supports a message platform for updating static data when the stored static data has expired in accordance with one or more illustrative embodiments.

Referring to FIG. 10, flowchart 1000 shows intermediate layer 102 supporting a message platform for updating static data when the stored static data has expired. If this situation occurs, intermediate layer 102 may generate a message to the registered source requesting for updated static data. When updated static is obtained from the registered source, intermediate layer 102 replaces the stored static data with the updated static data. When intermediate layer 102 determines that the stored static data has expired at block 1001, intermediate layer 102 sends a message to the registered source for updated static data at block 1002. When intermediate layer receives the updated static data at block 1003, intermediate layer 102 replaces the stored static data with the updated static data at block 1004.

Referring back to FIG. 9, at block 907 intermediate layer 102 determines whether all data components have been obtained for the data request from web layer 101. If so, the requested data (data(1), data(2), ..., data(n)) is returned at block 908 via web layer 101. Otherwise, at block 909 intermediate layer 102 accesses the next data component either from storage maintained at intermediate layer 102 or from the registered source through messaging.

With some embodiments, intermediate layer 102 may deny access to one or more data components in response to a data request via web layer 102. For example, a requestor may not be allowed access to one or more of the requested data components for security reasons.

Figure 11:
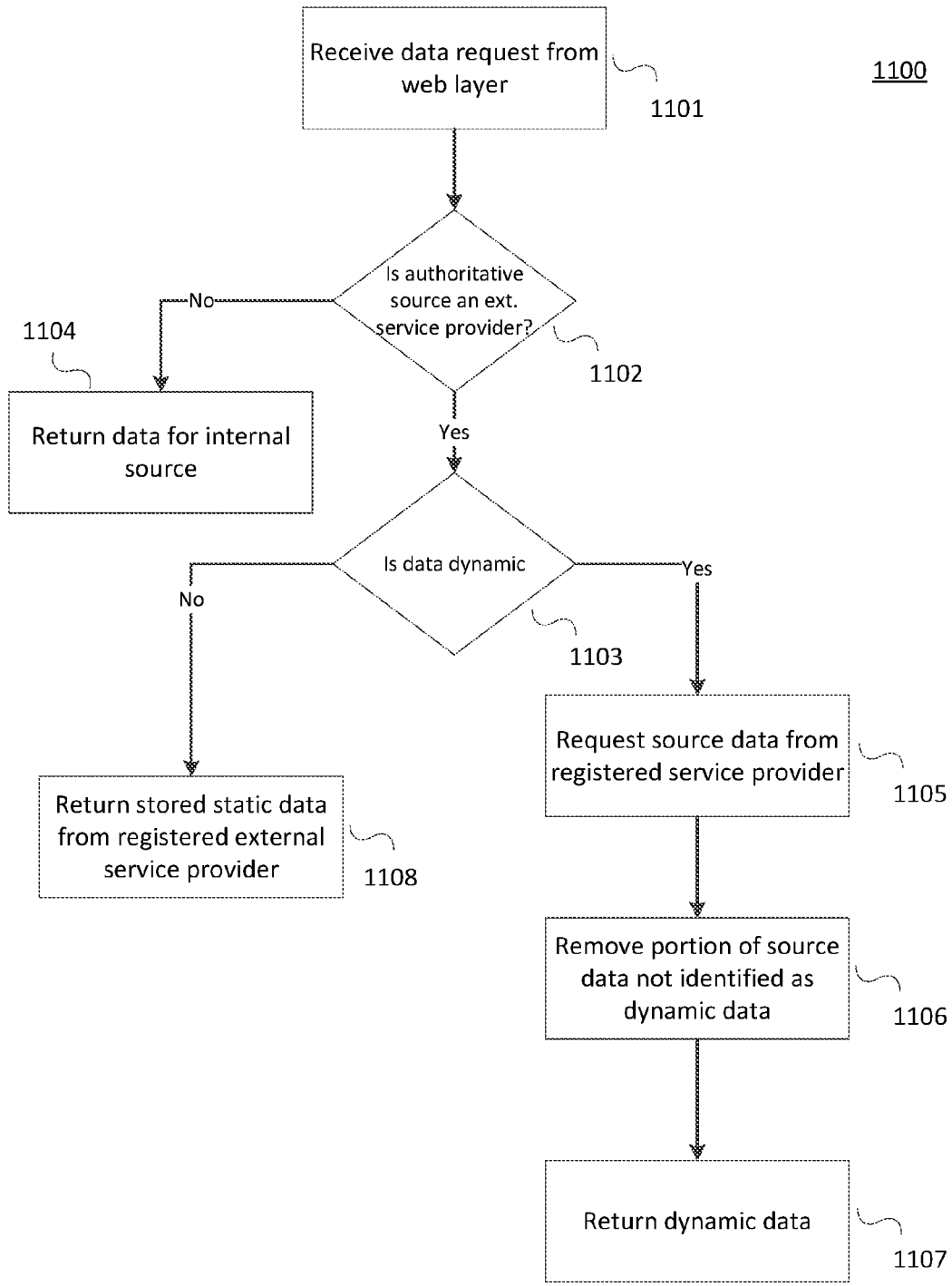
FIG. 11 shows a flowchart in which an intermediate layer controls data presentation when data is requested in accordance with one or more illustrative embodiments.

FIG. 11 shows flowchart 1100 in which intermediate layer 102 controls data presentation when data is requested through web layer 101 in accordance with one or more illustrative embodiments. Intermediate layer 102 may prevent unwanted, unsolicited, and/or compromised information (e.g., an announcement embedded in a webpage of an external service provider) from being presented to a requestor.

Figure 12:
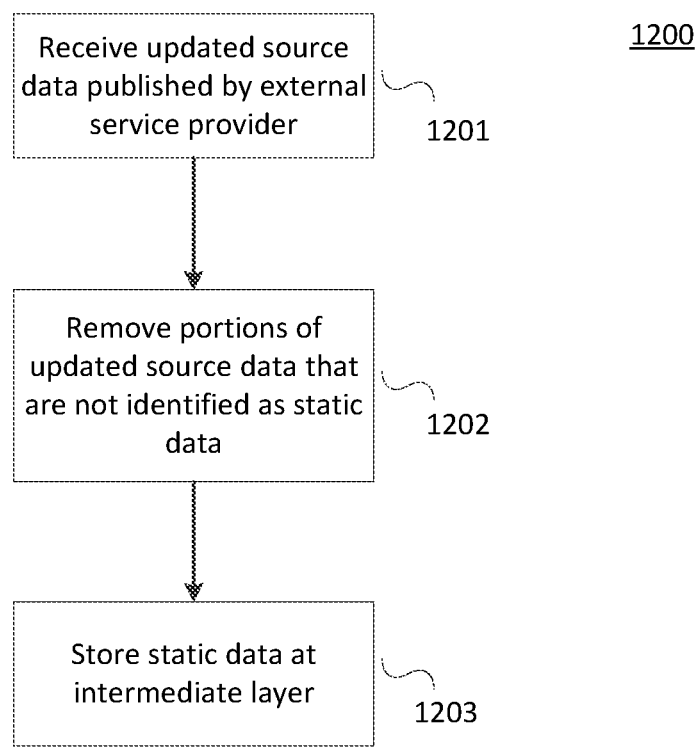
FIG. 12 shows a flowchart in which an intermediate layer controls data presentation when data is stored at the intermediate layer in accordance with one or more illustrative embodiments.

While flowcharts 1100 and 1200 (as shown in FIGS. 11 and 12, respectively) are directed to a situation where the source is an external service provider (e.g., service provider 112 as shown in FIG. 1), embodiments may be directed to a situation in which the registered source is an internal source in a computer system (e.g., applications 108 and 109 that are internal to computer system 100 as shown in FIG. 1). For example, when a registered source is internal, a data portion may be removed from source data because corresponding information is restricted for access only within the computer system and should not presented to a data request via web layer 101.

At block 1101, intermediate layer 102 receives a data request via web layer 101, where the requested data comprises one or more data components as previously discussed. The requested data may comprise static data and/or dynamic data, where the registered source is an external service provider or an internal source.

At block 1102, intermediate layer 102 determines whether the registered source is an external service provider or an internal source. If the registered source is an internal source, e.g., application 108 or application 109, the requested data may be accessed at block 1104 as discussed with flowchart 200 as shown in FIG. 2.

If the registered source is an external service provider, intermediate layer 102 determines whether the requested data comprises dynamic data or static data at block 1103.

When the requested data comprises static data, intermediate layer 102 accesses stored static data that is stored at intermediate layer 102. For example, as previously discussed in reference to FIG. 1, intermediate layer 102 at block 1108 may access the static value (corresponding to static data) stored at data set 107, where the static data is published by external service provider 112.

When the requested data comprises dynamic data, intermediate layer 102 requests source data from the registered external service provider. Source data may comprise the dynamic data that is requested in the data request as well as additional data (referred as a data portion) that is removed. For example, the source data may comprise a data representation of a webpage that includes third-party information (e.g., an embedded announcement) as well as the requested static data (e.g., a weather forecast). Because the embedded announcement may be unwanted or unsolicited or may contain compromised information, it may be advantageous to remove the embedded announcement from the source data and only return the static data to the requestor via web layer 102. However, there may be instances where all of the source data is contained in the static or dynamic data, where no data is removed.

Referring to FIG. 11, at block 1105 intermediate layer 102 requests source data (which includes the dynamic data) from the registered external service provider. At block 1106, intermediate layer 102 removes the data portion from source data to obtain the dynamic data. (A similar approach may be used when processing static data when published by its registered source.) Intermediate layer 102 then returns the dynamic data via web layer 102.

Referring to FIG. 1, intermediate layer 102 obtains source data from the registered service provider through a communication channel without interacting with web layer 101. The communication channel may also incorporate encryption/decryption for more secure communications as needed.

FIG. 12 shows flowchart 1200 in which intermediate layer 102 controls data presentation when static data is stored at intermediate layer 102 in accordance with one or more illustrative embodiments. At block 1201, the registered source publishes source data (which includes the updated static data). At block 1202, the data portion is removed from the source data to obtain the static data that is returned to web layer at block 1203.

Either dynamic or static data may be specified through an administration system via a communication interface as shown in FIG. 6. For example, the administration system may send one or more configuration message to processing device 603 specifying the data portion to be removed from source data provided by the registered source.

With some embodiments, the administration system may initiate removal of data due to timed data, aged data, changed data, new data, and/or incremental data.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. An apparatus for supporting an intermediate layer comprising:
    a processing device;
    a memory device;
    a storage subsystem;
    a first communication interface configured to communicate with a plurality of sources of data, wherein the plurality of sources comprises first, second, and third sources;
    a second communication interface interconnected with a web layer;
    an intermediate layer module stored in the memory device, executable by the processor, wherein the intermediate layer module supports an intermediate layer that interacts with the web layer wherein the intermediate layer module configured to cause the processor to:
        receive a data request through the second communication interface for requested data through the web layer, wherein the requested data comprises dynamic data and wherein the first source is registered for the dynamic data;
        generate an access message to the first source via the first communication interface to access first source data from the first source wherein the first source data comprises the dynamic data;
        receive a response from the first source, the response containing the first source data;
        remove a first data portion from the first source data to obtain the dynamic data wherein the dynamic data and the first data portion are distinct;
        return the dynamic data to the web layer via the second communication interface;
        store static data at the storage subsystem at the intermediate layer, wherein the static data is registered with a second source;
        receive updated second source data from the second source;
        remove a second data portion from the updated second source data, wherein the updated second source data comprises updated static data and the second data portion; and
        replace the static data with the updated static data at the storage subsystem.

2. The apparatus of claim 1, wherein the first source comprises a first external source of a first external service provider and wherein the apparatus interacts with the first external service provider via the first communication interface without interacting with the web layer.

3. The apparatus of claim 2, wherein the first data portion comprises a first third-party information component within a first webpage of the first external service provider.

4. The apparatus of claim 3, wherein the first third-party information component comprises a first announcement component.

5. The apparatus of claim 3, wherein the apparatus comprises a third communication interface and wherein the intermediate layer module is further configured to cause the processor to: receive a first configuration message via the third communication interface between the apparatus and an administrative system; and specify, by the first configuration message, removal of the first third-party information from content of the first webpage.

6. The apparatus of claim 1, wherein the first source comprises a first application associated with an application layer and wherein the intermediate layer interacts between the web layer and the application layer.

7. The apparatus of claim 1, wherein the second source comprises a second external source of a second external service provider and wherein the apparatus interacts with the second external service provider via the first communication interface without interacting with the web layer.

8. The apparatus of claim 7, wherein the second data portion comprises a second third-party information component within a second webpage of the second external service provider.

9. The apparatus of claim 8, wherein the second third-party information component comprises a second announcement component.

10. The apparatus of claim 1, wherein the second source comprises a second application associated with an application layer and wherein the intermediate layer interacts between the web layer and the application layer.

11. The apparatus of claim 8, wherein the apparatus comprises a third communication interface and wherein the intermediate layer module is further configured to cause the processor to: receive a second configuration message via the third communication interface between the apparatus and an administrative system; and specify, by the second configuration message, removal of the second third-party information from content of the second webpage.

12. The apparatus of claim 1, wherein the web layer receives the data request from a web browser and passes the data request to the intermediate layer.

13. The apparatus of claim 1, wherein the web layer receives the data request from an application and passes the data request to the intermediate layer.

14. One or more non-transitory computer-readable media for supporting an intermediate layer that interacts between a web layer and having computer-executable instructions stored thereon, the computer-readable media comprising:
a first set of codes for causing a computing device to receive a data request for requested data through the web layer, wherein the requested data comprises dynamic data and wherein the first source is registered for the dynamic data;
a second set of codes for causing the computing device to generate an access message to the first source via the first communication interface to access first source data from the first source wherein the first source data comprises dynamic data;
a third set of codes for causing the computing device to receive a response from the first source, the response containing the first source data;
a fourth set of codes for causing the computing device to remove a first data portion from the first source data and to obtain the dynamic data, wherein the dynamic data and the first data portion are distinct;
a fifth set of codes for causing the computing device to return the dynamic data via the web layer;
an eighth set of codes for causing the computing device to store static data at the storage subsystem at the intermediate layer, wherein the static data is registered with a second source;
a ninth set of codes for causing the computing device to receive updated second source data from the second source;
a ninth set of codes for causing the computing device to remove a second data portion from the updated second source data, wherein the updated second source data comprises updated static data and the second data portion; and
a tenth set of codes for causing the computing device to replace the static data with the updated static data at the storage subsystem.

15. The computer-readable media of claim 14, wherein the first source comprises an external source of an external service provider, the media further comprising: a sixth set of codes for causing the computing device to obtain the first source data comprising a webpage of the external service provider; and a seventh set of codes for causing the computing device to remove a third party information component from the webpage and to obtain the dynamic data.

16. A method for supporting an intermediate layer that interacts with a web layer, the method comprising:
receiving a data request for requested data through the web layer wherein the requested data comprises dynamic data and wherein a first external source of a first external service, provider is registered with the dynamic data;
generating an access message to the first external source via the access first source data from the first source without interacting through the web layer, wherein the first source data comprises the dynamic data;
receiving a response from the first external source, the response containing the first source data;
removing a first third-party information component from the first source data wherein the dynamic data and the first third-party information component are distinct; and
returning the dynamic data to the web layer;
storing static data at the storage subsystem at the intermediate layer, wherein the static data is registered with a second external source of a second external service provider;
receiving updated second source data from the second external source;
removing a second third-party information component from the updated second source data, wherein the updated second source data comprises updated static data and the second third-party information component; and
replacing the static data with the updated static data at the storage subsystem.

17. The method of claim 16, wherein the first third-party information component comprises an announcement component.

18. The method of claim 16, wherein the first source data comprises a data representation of a webpage of the first external service provider.

19. The method of claim, 16 wherein the requested data comprises a data component registered for an application, the application is associated with the application layer, and the intermediate layer interacts between the web layer and the application layer, the method further comprising:
obtaining application source data from the application;
removing a data portion from the application source data to obtain the data component; and returning the requested data via the web layer.

* * * * *